United States Patent [19]

Lanzetta, Jr. et al.

[11] Patent Number: 4,953,940

[45] Date of Patent: Sep. 4, 1990

[54] OPTICAL FIBER TERMINATION DEVICE HAVING CUTTING MEANS

[75] Inventors: Carmen Lanzetta, Jr., Hatboro; Michael Kieli, Bensalem, both of Pa.; Guenter Schindler, Lakewood; Russell H. Williams, Flemington, both of N.J.

[73] Assignee: Thomas & Betts Corporation, Bridgewater, N.J.

[21] Appl. No.: 694,353

[22] Filed: Jan. 24, 1985

[51] Int. Cl.$^5$ ............................ G02B 6/36; G02B 7/26
[52] U.S. Cl. ................................ 350/96.20; 350/96.21
[58] Field of Search ........................... 350/96.20, 96.21

[56] References Cited

U.S. PATENT DOCUMENTS

| | | | |
|---|---|---|---|
| 4,160,580 | 7/1979 | Le Noane et al. | 350/96.21 |
| 4,182,017 | 1/1980 | Ford et al. | 350/96.21 |
| 4,195,045 | 3/1980 | Mead | 350/96.21 |
| 4,326,767 | 4/1982 | Silbernagel et al. | 339/98 |
| 4,422,715 | 12/1983 | Williams et al. | 350/96.20 |
| 4,444,448 | 4/1984 | Silbernagel et al. | 339/98 |
| 4,582,392 | 4/1986 | Williams et al. | 350/96.20 |

Primary Examiner—William L. Sikes
Assistant Examiner—Robert E. Wise
Attorney, Agent, or Firm—Robert M. Rodrick; Salvatore J. Abbruzzese

[57] ABSTRACT

An optical fiber termination device is described which includes first and second housings supported for relative movement therebetween. The first housing supports an optical fiber cable and is insertable into a second housing which supports a cutting device for severing the cable and providing a termination end face. The composite structure is then insertable into a termination housing to provide optical connection with a further optical device.

6 Claims, 3 Drawing Sheets

OPTICAL FIBER TERMINATION DEVICE HAVING CUTTING MEANS

FIELD OF THE INVENTION

This invention relates generally to a fiber optic termination device and pertains more particularly to a device for terminating optical fibers, wherein the fiber is severed upon termination in the device.

BACKGROUND OF THE INVENTION

Typical techniques used to terminate optical fibers, which are known in the prior art, employ a two step process of termination. The first step being fiber termination where fibers are stripped of the outer jacket and cut adjacent the end thereof to provide a fiber end face which typically must be polished or otherwise prepared to enhance optical transmission therethrough. The second step requires the mechanical assembly of the prepared fiber end in a housing of a termination device for registration with an optical device such as a light emitting diode or another optical fiber. There exists known techniques which combine both the fiber preparation step and mechanical assembly step in one operation. In commonly assigned U.S. Pat. No. 4,422,715, issued Dec. 27, 1983, entitled "Fiber Optic Connector Having Fiber Cutting Means" and U.S. Pat. No. 4,582,392 issued Apr. 15, 1986 entitled, "Fiber Optic Connector Having Operable Fiber Retention Means" methods and apparatus are disclosed which provide a bridge between the separate fiber preparation and mechanical termination steps of previous devices, in one device.

In the above-referenced patent there is disclosed a fiber optic connector assembly in which a cutting device and a termination device are supported in fixed mutual relation in a common housing thereby bridging the two step approach. A companion housing provides for retentive engagement of the fiber. The housings are joinable in a first pre-cutting relation wherein the fiber spans the housings. The housings are mutually movable into a second relation effecting fiber cutting and are further mutually movable into a third relation providing registry of the termination device and the end face of the fiber resulting from the cutting. In the above-referenced co-pending patent application, a second device which provides such a bridge between fiber preparation and mechanical termination is disclosed. This device comprises a composite fiber cutting and terminating appartatus which includes a parent housing and an insert housing each adapted for mutual relative movement. The parent housing supports both an optical device and a cutting device. The insert housing supports the fiber. Upon movement of the insert housing into the parent housing, the fiber is retentively engaged by a support member of the insert housing. The fiber is moved into engagement with the cutting device, whereupon the fiber is cut to define an end face for termination with the optical device in the parent housing.

As can be seen, the above two referenced devices each provide for cutting of the optical fiber to form a termination end face and immediate positioning of that end face with an optical device. There is no provision in either device for further preparation of the end face of the fiber once it is cut by the cutting device. Thus, end face polishing or chemical preparation is not typically possible nor desirable with these devices. While the end faces provided by the cutting blades of each of these devices is more than adequate for optical transmission through the fiber for short lengths, the and face provided by such devices, may not be suitable for optical transmission through extended fiber lengths.

SUMMARY OF THE INVENTION

It is therefore an objective of the present invention to provide a fiber optic cutting and terminating device which would provide for both fiber preparation and mechanical termination in one operation.

It is a further object of the present invention to provide a termination device which would provide a superior termination end face on the fiber which is suitable for optical transmission through a fiber over extended lengths.

In attaining the foregoing and other objects, the present invention provides an apparatus of the type embodying both fiber preparation and mechanical termination in one apparatus. The resulting termination end face achieved by such termination would permit optical transmission through the fiber over extended lengths.

In a preferred embodiment described herein, an apparatus for cutting an optical fiber with a cutting device and terminating the optical fiber with an optical device is disclosed. The apparatus comprises a first housing and a second housing. The first housing supports the cutting device and is alignable with the optical device. A second housing which supports therein the fiber and is insertable into the first housing, comprises a pair of integrally attached fiber accommodating portions, each accommodating a succesive longitudinal extent of the fiber. The fiber accommodating portions define a passage thereinbetween for accommodating the cutting device upon insertion of the second housing into the first housing thereby severing the fiber at the passage and defining a termination end face adjacent the passage. The provision of supporting the fiber on both sides of the cutting device as the fiber is being passed over the cutting device, provides a termination end face of superior quality which enhances optical transmission through the fiber over extended fiber lengths.

DETAILED DESCRIPTION OF THE PREFERRED EMBODIMENTS

Figure 1:
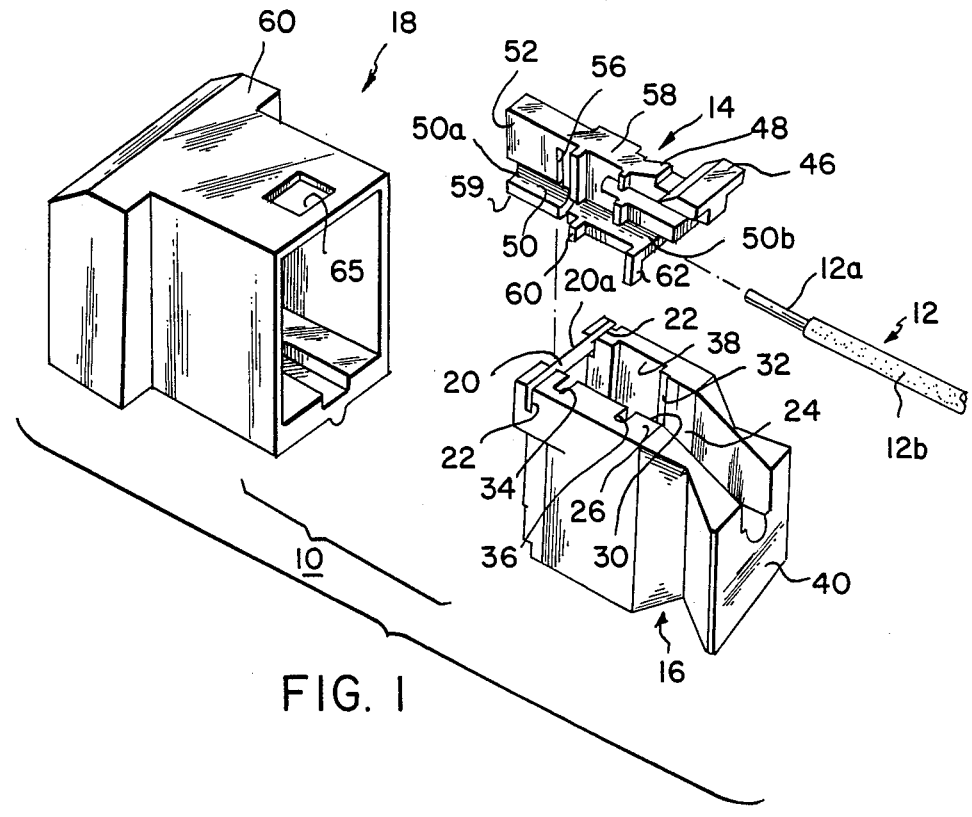
FIG. 1 shows in exploded perspective view the optical fiber termination device of the present invention including the optical fiber plug, receptacle and termination housing.

Referring to FIG. 1, an apparatus 10 for termination of an optical fiber 12 is shown. Apparatus 10 includes a first housing or plug 14 for accommodating an optical fiber, a second housing or receptacle 16 for accommodating plug 14 and a termination device 18 for supporting an optical element (not shown), such as an LED, photo diode, optical fiber or the like.

Fiber optic cable 12 is of conventional construction typically including a plastic fiber core 12a surrounded by outer plastic jacket 12b. In the present illustrative embodiment, plastic fiber core 12a is shown, however, the present invention contemplates use of glass fibers as well as plastic. Each of elements 14, 16 and 18 are typically constructed of a rigid plastic material such as Norell plastic or similar suitable material.

Figure 2:
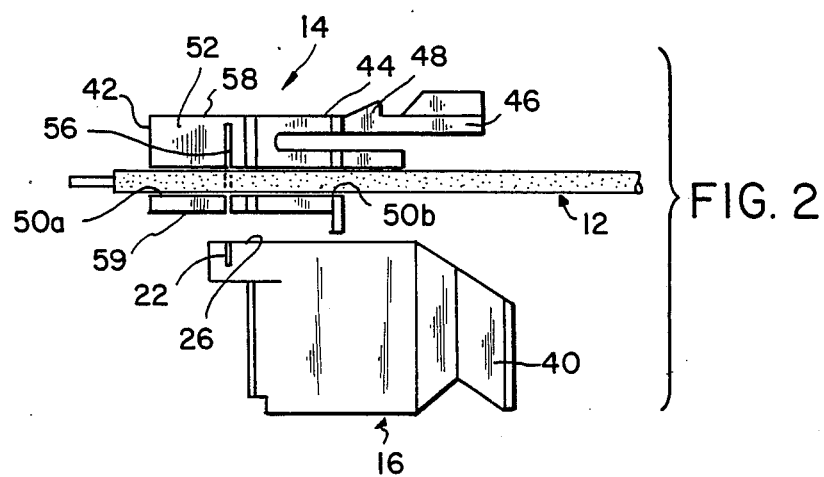
FIG. 2 shows the optical fiber plug and receptacle sub-assembly of FIG. 1 with the optical fiber supported in the fiber plug.
Figure 3:
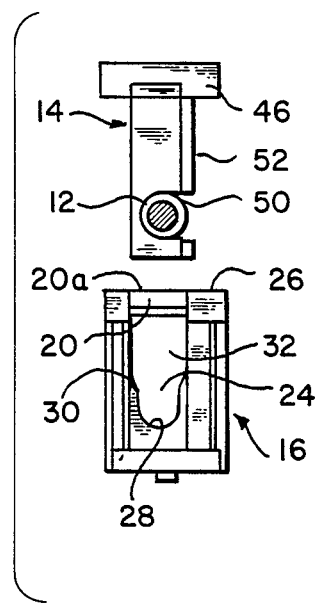
FIG. 3 is a side view of the plug and receptacle sub-assembly of FIG. 2.

Referring additionally to FIGS. 2 and 3, receptacle 16 is generally a rectangular member which supports an elongate blade 20, having a cutting edge 20. The blade 20 is supported at the upper end of receptacle 16 and is staked or otherwise suitably secured in slots 22 of receptacle 16. Receptacle 16 includes a central longitudinal channel 24 which opens into upper wall 26 of receptacle 16 and is bounded by an arcuate floor 28 and side walls 30 and 32. Side walls 30 and 32 each include a unique pattern of detent tracks 34 and 36 on side wall 30 and 38 on side wall 32 to provide key alignment for plug 14 which is inserted into channel 24, as will be described in greater detail hereinbelow. Receptacle 16 further includes a flaired rearward end portion 40 which facilitates insertion and removal of receptacle 16 in termination housing 18, which also will be described in further detail hereinbelow.

Fiber optic plug 14 is an elongate member having a first end portion 42 for insertion toward the forward portion 21 of receptacle 16 and a rear portion 44 for insertion adjacent the rearward flaired portion 40 of receptacle 16. Plug 14 further includes a cantilevered lever 46 which extends from the upper rearward portion 44 and serves as a deflectable latch to secure the plug 14 and receptacle 16 in termination housing 18. A projection 48 on lever 46 is insertable into an aligned opening in termination housing 18 to lock the plug 14 and receptacle 16 in proper alignment in termination housing 18. Plug 14 further includes an elongate channel 50, extending longitudinally therealong. Channel 50 is generally a C-shaped channel opening into sidewall 52 of plug 14. Plug 14 is divided between its front end 42 and rearward end 44 by a transverse slot 56 which extends from its floor 56a, just below the upper surface 58 of plug 14 and opens into lower surface 59 thereof. In addition to dividing plug 14, slot 56 also divides channel 50 into two subchannels, forward sub-channel 50a and rearward subchannel 50b. Slot 56 accommodates for slidable passage therethrough blade 20 of receptacle 16 upon insertion of plug 14 into channel 24. As shown in FIG. 2, optical fiber 12 is held in channel 50 of plug 14 so that a portion of fiber 12 is supported in both forward subchannel 50a and rearward subchannel 50b. Thus, upon insertion of plug 14 into receptacle 16 as will be described further hereinafter, blade 20 and upper cutting edge 20a will sever optical cable 12 at its location adjacent slot 56, thereby forming a termination end face 12c (FIG. 4) on optical fiber 12. The cutting edge 20a of blade 20 will contact the floor 56a to slightly score the same, weakening the junction between forward portion 42 and rearward portion 44 of plug 14. When positioned in the heretofore described interfitting position, plug 14 and receptacle 16 form a termination sub-assembly 15 which supports a terminal end of fiber 12. As will be described hereinbelow, forward portion 42 of plug 14 can be frangibly removed at the scored floor 56a of slot 56 from termination sub-assembly 15 (FIG. 5).

Figure 5:
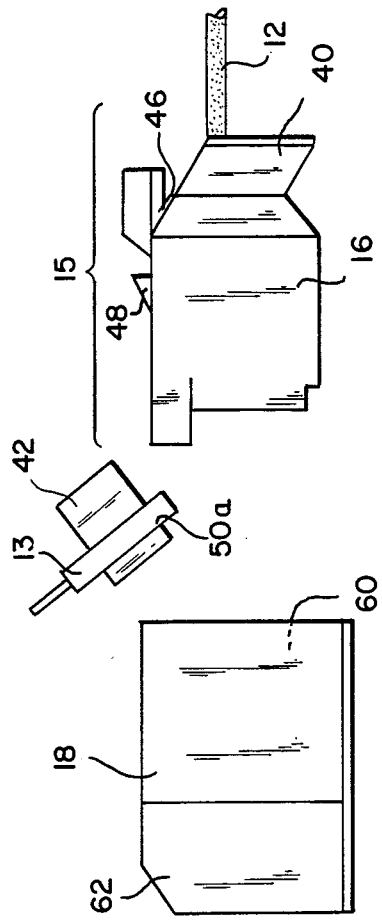
FIG. 5 is a side view of the plug and receptacle sub-assembly including the terminated fiber, shown disassembled from the termination housing.

As shown in FIGS. 1 and 5, termination housing 18 is generally a rectangular member having a central open chamber 60 which is dimensioned to accommodate termination sub-assembly 15 with forward end 42 of plug 14 frangibly removed. A rearward portion 62 of termination housing 18 supports therein an optical device (not shown) for optical registry with the termination end face 12c of optical fiber 12.

Having described the individual elements of connection apparatus 10, its operation and the interconnection of its various elements may now be described with reference to FIGS. 1 through 5.

Figure 4:
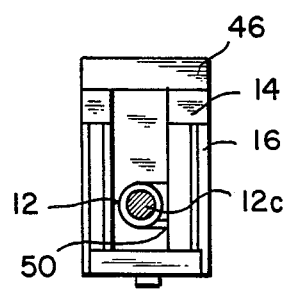
FIG. 4 shows the optical fiber plug of FIG. 2 inserted in the fiber receptacle, with the front portion of the fiber plug removed.

Optical cable 12 is placed in channel 50 of plug 14 as shown in FIG. 2. As the engagement of plug 14 with receptacle 16 will terminate cable 12 thereby providing a fiber end face 12c. Cable 12 needs no special preparation prior to its insertion into plug 14. The cable is inserted in channel 50 so that an extent of cable 12 extends beyond each longitudinal edge of plug 14. Plug 14 is then moved from a position above receptacle 16, as shown in FIG. 3, to a lower position in channel 24 of receptacle 16, as shown in FIG. 4. Polarization keys 60 and 62 on plug 14 (FIG. 1) engage tracks 34 and 36, respectively, of receptacle 16 to provide a mating fit of plug 14 in channel 24 of receptacle 16. As the plug passes into channel 24, blade 20 is moved into slot 56. The cutting edge 20a of blade 20 passes through cable 12 to sever the same into two parts; one being held by subchannel 50a, and the other being held by subchannel 50b. During cutting, the optical cable 12 is being supported on both sides of the cutting blade 20 by each sub-channel 50a and 50b. Thus, a more uniform termination end face 12c will be provided at the point of severing then is possible when supporting the fiber on only one side of the cutting blade. As the cutting blade 20 is passed through slot 56 to sever cable 12, the cable is prevented from bending or being deflected upon contact with the cutting blade 20 by the support of the cable on both sides of the blade. Thus, the cutting blade 20 will pass substantially perpendicularly through the cable both upon initial contact with the cable and throughout its movement through the cable. This results in a termination end face which will be substantially perpendicular to the cable 12. As the degree of perpendicularity of the end face to the fiber translate directly to improved optical transmission through the fiber, a termination end face which more closely approximates true perpendicuarlity will enhance optical transmission and permit transmission through an extended length of cable. The dimensional relationship between channel 50 of plug 14 and cable 12 is such that the cable is snugly fit in the channel 50 so that movement of the cable in channel 50 upon contact with the cutting blade 20 is minimized, thus further assuring a proper cut.

Referring now to FIGS. 4 and 5, once the plug 14 is inserted into receptacle 16 and cable 12 is severed to form termination end face 12c, the front end of 42 of plug 14 may be removed from the remainder of termination subassembly 15. Front end 42 of plug 14 is only supported to the remainder of plug 14 by the small web of material at the floor 56a of slot 56. Further, this floor 56a has been scored by the cutting edge 20a of blade 20, thus the front end 42 of plug 14 is easily frangibly removed from the remainder of the plug 14. With the removal of front end 42 from the remainder of plug 14, a scrap end 13 of optical cable 12, which is supported in subchannel 50a, is also removed. Thus, the termination end face 12c of cable 12 will remain adjacent the front face of receptacle 16 (FIG. 4). The termination sub-assembly 15 (FIG. 5), can then be inserted in termination housing 18. Upon insertion, projection 48 on cantilevered lever 46 will deflect downwardly due to a forward bevel surface 48a thereon, to permit insertion of termination sub-assembly 15 in the chamber of termination housing 18. Projection 48 will then snap into upper opening 65 to secure termination sub-assembly 15 in housing 18. Removal of termination sub-assembly 15 may be facilitated by manually deflecting downwardly the extending edge of lever 46 to remove projection 48 from opening 65. The termination sub-assembly 15 can then be removed grasping on flaired end portion 40.

The optical device supported in rear portion 64 of termination housing 18 is positionally located for alignment with the termination end face 12c of optical cable 12 upon insertion of the plug and receptacle combination 15 thereon.

Figure 6:
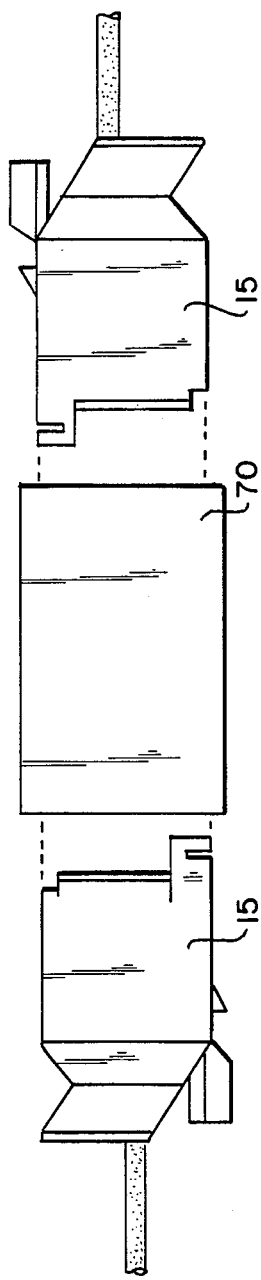
FIG. 6 shows an alternate embodiment of the present invention wherein a pair of plug and receptacle sub-assemblies are shown supported in a central sleeve for connecting two optical fibers.

An alternate embodiment of the present invention is shown in FIG. 6. A pair of termination sub-assemblies 15, which are formed in identical manner as above-described, are disposed on either side of hollow rectangular housing 70. Housing 70 is designed for captive receipt of each of termination sub-assemblies 15 on either side thereof in a manner substantially similar to that shown in FIG. 5. Appropriate cooperative keying and locking means may be included on the subassemblies 15 and/or housing 70 to facilitate interconnection. As can be seen in FIG. 6, each of termination sub-assemblies 15 are inversely oriented for insertion on either end of housing 70. Thus, upon a full insertion of each termination sub-assembly 15, the termination end face held in each will be aligned for optical transmission therethrough. Thus, the present invention contemplates not only fiber termination with an LED, photo diode or other active element, but also contemplates use as a connector for a pair of optical fibers.

Various changes may be made to the foregoing without departing from the invention. The particularly described and illustrated preferred embodiment is thus intended in an illustrative and not in a limiting sense. The true scope of the invention is set forth in the following claims.

We claim:

1. An apparatus for cutting an optical fiber with a cutting device and terminating said optical fiber, said apparatus comprising:
    a first housing defining a channel and supporting said cutting device across a portion of said channel; and
    a second housing insertably received in said first housing for supporting said fiber; said second housing including first and second integrally attached spaced-apart fiber accommodating portions each for accommodating and supporting respectively and end extent of said fiber and a successive spaced-apart longitudinal extent of said fiber, said first and second fiber accommodating portions defining a passage thereinbetween which receives said cutting device upon insertion of said second housing into said first housing to thereby sever said fiber between said first and second spaced-apart fiber accommodating portions and to thereby define a fiber termination surface adjacent to said passage; said second fiber accommodating portion being resident interiorly of said first housing channel and said first fiber accommodating portion being resident exteriorly of said first housing channel upon insertion of said second housing into said first housing; and wherein said first fiber accommodating portion is frangibly removable from said second fiber accommodating portion.

2. An apparatus in accordance with claim 1 wherein said second housing includes keying means for polarized insertion of said second housing in said first housing channel.

3. An apparatus for terminating an elongate optical fiber comprising:
    a first housing having a channel therein; a cutting element supported in said channel of said first housing;
    a second housing for supporting said fiber and being insertably received in said channel of said first housing;
    said second housing including a first fiber support member for supporting an end extent of said fiber and a second fiber support member spaced from said first fiber support member for supporting a longitudinally successive extent of said fiber; and
    accessing means intermediate said first and second fiber support member which accommodates said cutting element of said first housing upon said insertion of said second housing into said first housing for severing said fiber at a location between said end extent and said longitudinally successive extent; said first fiber support member being frangibly removable from said second fiber support member.

4. An apparatus in accordance with claim 3 wherein said first and second housings include mutually cooperative polarization means for providing polarized receipt of second housing in said channel of said first housing.

5. An apparatus in accordance with claim 4 wherein said second support element is adapted for residence in said first housing channel upon insertion of said second housing into said first housing.

6. An apparatus in accordance with claim 5 wherein said first support element is adapted for residence external of said first housing channel upon insertion of said second housing into said first housing.

* * * * *